United States Patent
Evans et al.

(10) Patent No.: US 8,812,402 B2
(45) Date of Patent: Aug. 19, 2014

(54) METHODS, APPARATUS AND ARTICLES FOR USE IN ASSOCIATION WITH TOKEN

(75) Inventors: Paul Michael Evans, Hampshire (GB); Colin Tanner, Middlesex (GB)

(73) Assignee: MasterCard International Incorporated, Purchase, NY (US)

( * ) Notice: Subject to any disclaimer, the term of this patent is extended or adjusted under 35 U.S.C. 154(b) by 434 days.

(21) Appl. No.: 12/348,726

(22) Filed: Jan. 5, 2009

(65) Prior Publication Data

US 2010/0174612 A1 Jul. 8, 2010

(51) Int. Cl.
*G06Q 20/00* (2012.01)
*G06Q 20/36* (2012.01)

(52) U.S. Cl.
CPC ................................ *G06Q 20/3672* (2013.01)
USPC .................... 705/66; 705/16; 705/39; 705/65

(58) Field of Classification Search
CPC ................................................. G06Q 30/0605
USPC .................... 705/18, 39, 66, 17; 235/280, 385
See application file for complete search history.

(56) References Cited

U.S. PATENT DOCUMENTS

| | | | |
|---|---|---|---|
| 3,044,606 A | 7/1962 | Frosh | |
| 4,439,941 A | 4/1984 | Halperin | |

(Continued)

FOREIGN PATENT DOCUMENTS

| | | | |
|---|---|---|---|
| WO | 98/33193 A1 | 7/1998 | |
| WO | 99/38173 A1 | 7/1999 | |
| WO | 00/79546 A1 | 12/2000 | |

OTHER PUBLICATIONS

International Standard, "Identification cards—Physical Characteristics", ISO/IEC 7810, Third Edition, Nov. 1, 2003, 18pgs.

(Continued)

*Primary Examiner* — Ryan Zeender
*Assistant Examiner* — Hunter Wilder
(74) *Attorney, Agent, or Firm* — Buckley, Maschoff & Talwalkar LLC

(57) ABSTRACT

In some embodiments, a method comprises receiving a request from a customer to temporarily associate a token issued to the customer with a payment account associated with the customer, and temporarily associating the token with the payment account in response at least in part to the request. In some embodiments, a method comprises issuing a token to a customer before the token is associated with a payment account; and arranging for the customer to have an ability to request that the token be associated with a payment account and usable as a payment token. In some embodiments, a method comprises receiving a mapping associating an identifier of a token with a payment account; receiving the identifier from a point of sale system; and determining the payment account based at least in part on the mapping and the identifier received from the point of sale system. In some embodiments, apparatus comprises: a processing system to: receive a request from a customer to temporarily associate a token issued to the customer with a payment account associated with the customer, and temporarily associate the token with the payment account in response at least in part to the request. In some embodiments, apparatus comprises: a processing system to: receive a mapping associating an identifier of a token with a payment account; receive the identifier from a point of sale system; and determine the payment account based at least in part on the mapping and the identifier received from the point of sale system.

10 Claims, 8 Drawing Sheets

(56) References Cited

U.S. PATENT DOCUMENTS

| | | | |
|---|---|---|---|
| 4,562,342 A | 12/1985 | Solo | |
| 5,276,311 A | 1/1994 | Hennige | |
| 5,570,081 A | 10/1996 | Holstrom | |
| 5,585,787 A | 12/1996 | Wallerstein | |
| 5,769,457 A | 6/1998 | Warther | |
| 5,955,961 A | 9/1999 | Wallerstein | |
| 5,975,584 A | 11/1999 | Vogt | |
| 6,002,605 A | 12/1999 | Iwaski et al. | |
| 6,193,163 B1 | 2/2001 | Fehrman et al. | |
| 6,199,757 B1 | 3/2001 | Kubert | |
| 6,272,009 B1 | 8/2001 | Buican et al. | |
| 6,315,195 B1 | 11/2001 | Ramachandran | |
| 6,315,205 B1 | 11/2001 | Bates, III | |
| D454,910 S | 3/2002 | Smith et al. | |
| 6,353,811 B1 | 3/2002 | Weissman | |
| 6,419,158 B2 | 7/2002 | Hooglander | |
| 6,447,140 B1 | 9/2002 | Lu | |
| 6,543,809 B1 | 4/2003 | Kistner et al. | |
| 6,561,432 B1 | 5/2003 | Vedder et al. | |
| 6,594,154 B1 | 7/2003 | Brewer et al. | |
| 6,631,849 B2 | 10/2003 | Blossom | |
| 6,636,833 B1* | 10/2003 | Flitcroft et al. | 705/39 |
| 6,641,049 B2 | 11/2003 | Luu | |
| 6,715,679 B1 | 4/2004 | Infosino | |
| 6,722,571 B1 | 4/2004 | Lavrut et al. | |
| 6,764,005 B2 | 7/2004 | Cooper | |
| 6,766,952 B2 | 7/2004 | Luu | |
| 6,769,718 B1 | 8/2004 | Warther et al. | |
| 6,817,534 B2 | 11/2004 | Gray | |
| 6,863,220 B2 | 3/2005 | Selker | |
| 6,957,771 B2 | 10/2005 | Norris, Jr. | |
| 6,964,377 B1 | 11/2005 | Haghiri et al. | |
| 6,978,940 B2 | 12/2005 | Luu | |
| 7,000,844 B1 | 2/2006 | Smith | |
| 7,012,504 B2 | 3/2006 | Tuttle | |
| 7,065,195 B1 | 6/2006 | Smith et al. | |
| 7,114,659 B2 | 10/2006 | Harari et al. | |
| 7,143,419 B2 | 11/2006 | Fischer et al. | |
| 7,183,636 B1 | 2/2007 | Boccia et al. | |
| 7,188,762 B2 | 3/2007 | Goade, Sr. et al. | |
| 7,204,412 B2 | 4/2007 | Foss, Jr. | |
| 7,246,172 B2 | 7/2007 | Yoshiba et al. | |
| D561,252 S | 2/2008 | Phillips et al. | |
| 7,334,737 B2 | 2/2008 | Sheats | |
| 7,438,224 B1 | 10/2008 | Jensen et al. | |
| D582,474 S | 12/2008 | Phillips et al. | |
| 7,559,469 B2 | 7/2009 | Noda et al. | |
| 7,578,431 B2 | 8/2009 | Tanner et al. | |
| 7,604,176 B2 | 10/2009 | Bates et al. | |
| 7,641,111 B2 | 1/2010 | Adams et al. | |
| 2001/0001856 A1* | 5/2001 | Gould et al. | 705/39 |
| 2001/0022301 A1 | 9/2001 | O'Donnell | |
| 2001/0034659 A1 | 10/2001 | Kobayashi | |
| 2002/0008610 A1 | 1/2002 | Peterson | |
| 2002/0139848 A1* | 10/2002 | Catan | 235/385 |
| 2002/0143624 A1* | 10/2002 | Catan | 705/14 |
| 2002/0154607 A1 | 10/2002 | Forstadius et al. | |
| 2002/0185855 A1 | 12/2002 | Klure | |
| 2003/0022537 A1 | 1/2003 | Bricaud et al. | |
| 2003/0085288 A1 | 5/2003 | Luu | |
| 2003/0132301 A1 | 7/2003 | Selker | |
| 2004/0124248 A1 | 7/2004 | Selker | |
| 2004/0129785 A1 | 7/2004 | Luu | |
| 2004/0195305 A1 | 10/2004 | Dotson | |
| 2004/0195340 A1 | 10/2004 | Lubking | |
| 2004/0223305 A1 | 11/2004 | Amiot et al. | |
| 2005/0023359 A1 | 2/2005 | Saunders | |
| 2005/0033688 A1 | 2/2005 | Peart et al. | |
| 2005/0045732 A1 | 3/2005 | Whitaker | |
| 2005/0203914 A1 | 9/2005 | Bryant et al. | |
| 2005/0220046 A1 | 10/2005 | Falck et al. | |
| 2005/0247798 A1 | 11/2005 | Graves et al. | |
| 2005/0258245 A1 | 11/2005 | Bates et al. | |
| 2005/0278222 A1 | 12/2005 | Nortrup | |
| 2006/0006225 A1 | 1/2006 | Goade, Sr. et al. | |
| 2006/0037502 A1 | 2/2006 | Warther | |
| 2006/0095342 A1 | 5/2006 | Pilu et al. | |
| 2006/0105810 A1 | 5/2006 | Gnuschke | |
| 2006/0118639 A1 | 6/2006 | Kean et al. | |
| 2006/0136292 A1 | 6/2006 | Bhati et al. | |
| 2006/0137464 A1 | 6/2006 | Baudendistel | |
| 2006/0174104 A1* | 8/2006 | Crichton et al. | 713/155 |
| 2006/0180647 A1 | 8/2006 | Hansen | |
| 2006/0244592 A1 | 11/2006 | Kansala et al. | |
| 2007/0008130 A1 | 1/2007 | Ashwood Smith | |
| 2007/0039687 A1 | 2/2007 | Hamilton et al. | |
| 2007/0063052 A1 | 3/2007 | Chakiris et al. | |
| 2007/0115129 A1 | 5/2007 | Kessler | |
| 2007/0145150 A1 | 6/2007 | Barczyk et al. | |
| 2007/0152035 A1 | 7/2007 | Adams et al. | |
| 2007/0176007 A1 | 8/2007 | Priya et al. | |
| 2007/0246548 A1* | 10/2007 | Schultz et al. | 235/494 |
| 2007/0251994 A1 | 11/2007 | Kingsborough et al. | |
| 2007/0262134 A1 | 11/2007 | Humphrey et al. | |
| 2007/0278293 A1 | 12/2007 | Anderson et al. | |
| 2007/0278317 A1 | 12/2007 | Onishi et al. | |
| 2008/0011859 A1 | 1/2008 | Phillips | |
| 2008/0035740 A1 | 2/2008 | Tanner | |
| 2008/0041935 A1* | 2/2008 | Fawcett | 235/380 |
| 2008/0048026 A1* | 2/2008 | Gangi | 235/380 |
| 2008/0054078 A1 | 3/2008 | Tanner | |
| 2008/0061148 A1 | 3/2008 | Tanner | |
| 2008/0061149 A1 | 3/2008 | Tanner | |
| 2008/0061150 A1 | 3/2008 | Phillips | |
| 2008/0061151 A1 | 3/2008 | Phillips | |
| 2008/0068181 A1 | 3/2008 | Phillips | |
| 2008/0089182 A1 | 4/2008 | Scheybal | |
| 2008/0121707 A1* | 5/2008 | Phillips et al. | 235/451 |
| 2008/0165006 A1 | 7/2008 | Phillips | |
| 2008/0186145 A1 | 8/2008 | Manley et al. | |
| 2008/0190784 A1 | 8/2008 | Phillips | |
| 2008/0191878 A1 | 8/2008 | Abraham | |
| 2008/0245856 A1 | 10/2008 | Jensen et al. | |
| 2008/0251968 A1 | 10/2008 | Misner et al. | |
| 2009/0045963 A1 | 2/2009 | Vigneron et al. | |
| 2009/0065575 A1 | 3/2009 | Phillips et al. | |
| 2009/0065587 A1 | 3/2009 | Phillips | |
| 2009/0108060 A1 | 4/2009 | Phillips et al. | |
| 2009/0157310 A1 | 6/2009 | Nortrup | |
| 2009/0166407 A1 | 7/2009 | Phillips | |
| 2009/0166408 A1 | 7/2009 | Phillips | |
| 2009/0166428 A1 | 7/2009 | Phillips et al. | |
| 2009/0195364 A1 | 8/2009 | Edwards et al. | |
| 2010/0031043 A1* | 2/2010 | Burger et al. | 713/170 |
| 2010/0163616 A1 | 7/2010 | Phillips et al. | |
| 2010/0174612 A1 | 7/2010 | Evans et al. | |
| 2010/0328029 A1 | 12/2010 | Kolek | |

OTHER PUBLICATIONS

"The Design of a Smart Card Interface Device: Chapter 5—Smart Card Protocols and ISO 7816-4", Retrieved Feb. 22, 2007. Retrieved from URL: http://www.cs.uct.ac.za/Research/DNA/SOCS/rchap5.html, 10pgs.

Jay MacDonald, "Calling Dick Tracy: Credit card watches debut", Mar. 24, 2009, Credit Cards.com, 2pgs.

Leslie Berlin, "Cellphones as Credits? Americans Must Wait", Jan. 24, 2009, The New York Times, [Retrieved Jan. 26, 2009]. Retrieved from URL: http://www.nytimes.com/2009/01/25/business/25proto.html?_r=1&em, 3pgs.

"Speedpass and Timex offer payments-by-wristwatch", Dec. 10, 2002, [Retrieved Mar. 31, 2009]. Retrieved from URL: http://www.finextra.com/fullstory.asp?id=7530, 2pgs.

"JCB pilots contactless payments", Apr. 1, 2004, [Retrieved Mar. 31, 2009]. Retrieved from URL: http://www.finextra.com/fullstory.asp?id=11549, 2pgs.

JCB delivers contactless Offica service over Casio wrist watch, Jun. 14, 2004, [Retrieved Mar. 31, 2009]. Retrieved from URL: http://www.finextra.com/fullstory.asp?id=11994, 2pgs.

"MasterCard launches OneSmart Paypass", Nov. 2, 2004, [Retrieved Mar. 31, 2009]. Retrieved from URL: http://www.finextra.com/fullstory.asp?id=12788, 2pgs.

(56) References Cited

OTHER PUBLICATIONS

"Visa launches contactless payments system in US", Feb. 25, 2005, [Retrieved Mar. 31, 2009]. Retrieved from URL: http://www.finextra.com/fullstory.asp?id=13291, 2pgs.

"Contact sports fans go contactless with MasterCard PayPass", Feb. 22, 2005, [Retrieved Mar. 31, 2009]. Retrieved from URL: http://www.finextra.com/fullstory.asp?id=13291, 2pgs.

Ian Rowley (in Tokyo), "$5,000? Put It on My Cell", Jun. 6, 2005, Asian Business, Business Week, [Retrieved Mar. 31, 2009]. Retrieved from URL: http://www.businessweek.com/print/magazine/content/05_23/b3936060.htm?chan=gl, 2pgs.

"Citibank to roll out MasterCard PayPass contactless keyring", Aug. 25, 2005, [Retrieved Mar. 31, 2009]. Retrieved from URL: http://www.finextra.com/fullstory.asp?id=14154, 2pgs.

Michael Fitzgerald, "Use your Cell Phone Instead of Your Credit Card", Monday, Sep. 19, 2005, PC World Communications, Inc., 2ps.

"Chinatrust releases PayPass-enabled wrist watch", Jun. 7, 2006, [Retrieved Mar. 31, 2009]. Retrieved from URL: http://www.finextra.com/fullstory.asp?id=15406, 2pgs.

"Turkey's Garanti Bank to issue PayPass wrist watch", May 8, 2007, [Retrieved Mar. 31, 2009]. Retrieved from URL: http://www.finextra.com/fullstory.asp?id=16902, 2pgs.

"Turkey gets wristwatch with built-in credit card", May 11, 2007, [Retrieved Mar. 30, 2009]. Retrieved from URL: http://www.wristdreams.com/archives/2007/05/turkey_gets_wri.html, 4pgs.

"Wristwatch Equipped With a Built-In Credit Card", Thursday, May 17, 2007, [Retrieved Mar. 30, 2009]. Retrieved from URL: http://www.crookedbrains.net/2007/05/wristwatch-equipped-with-built-in.html, 4pgs.

"Wristwatch With Built-In Credit Card", Saturday, May 26th, 2007, [Retrieved Mar. 30, 2009]. Retrieved from URL: http://www.funniestgadgets.com/2007/05/26/wristwatch-with-built-in-credit-card/, 3pgs.

Karen Bruno, "Artist peddling designs for your credit card", Aug. 8, 2007, [Retrieved Mar. 31, 2009]. Retrieved from URL: http://www.creditcards.com/credit-card-news/credit-card-designs-and-covers-1273.php, 3pgs.

"Credit Card Rings (1964)", Thursday, Sep. 13, 2007, Paleo-Future, [Retrieved Mar. 30, 2009]. Retrieved from URL: http://www.paleofuture.com/blog/2007/9/14/credit-card-rings-1964.html, 5pgs.

"Altair unveils pre-paid contactless PayPass wrist watch", Jun. 27, 2008, [Retrieved Mar. 31, 2009]. Retrieved from URL: http://www.finextra.com/fullstory.asp?id=18654, 3pgs.

Wikipedia, the free encyclopedia, "EMV", retrieved date Sep. 16, 2011, download from http://en.wikipedia.org/wiki/EMV, 13pgs.

"Smart Card News Online", Jan. 11, 2008, Smart Card News Ltd (SCN), retrieved date Sep. 16, 2011, download from http://www.smartcard.co.uk/NOLARCH/2008/January/110108.html, 4pgs.

* cited by examiner

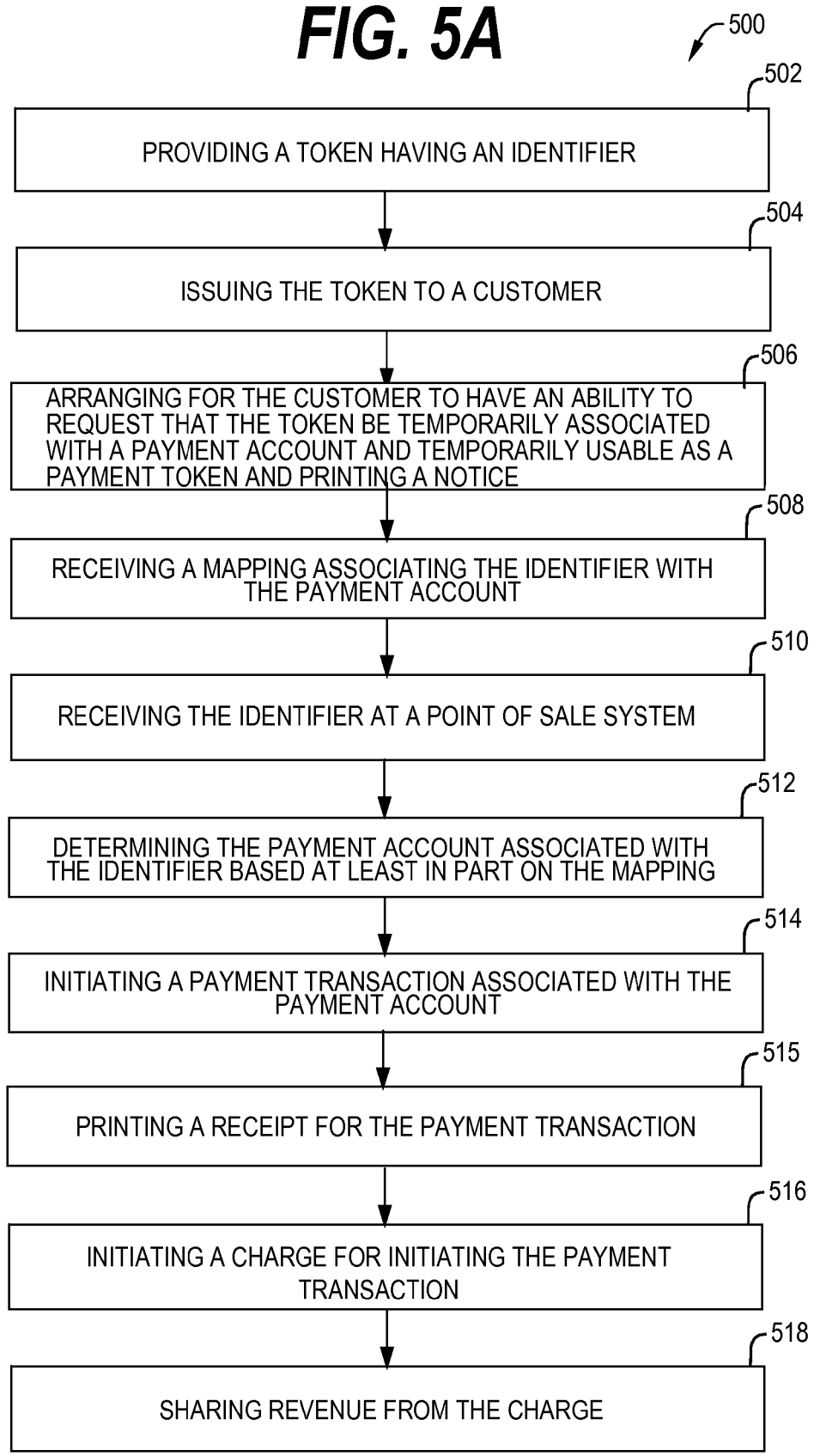

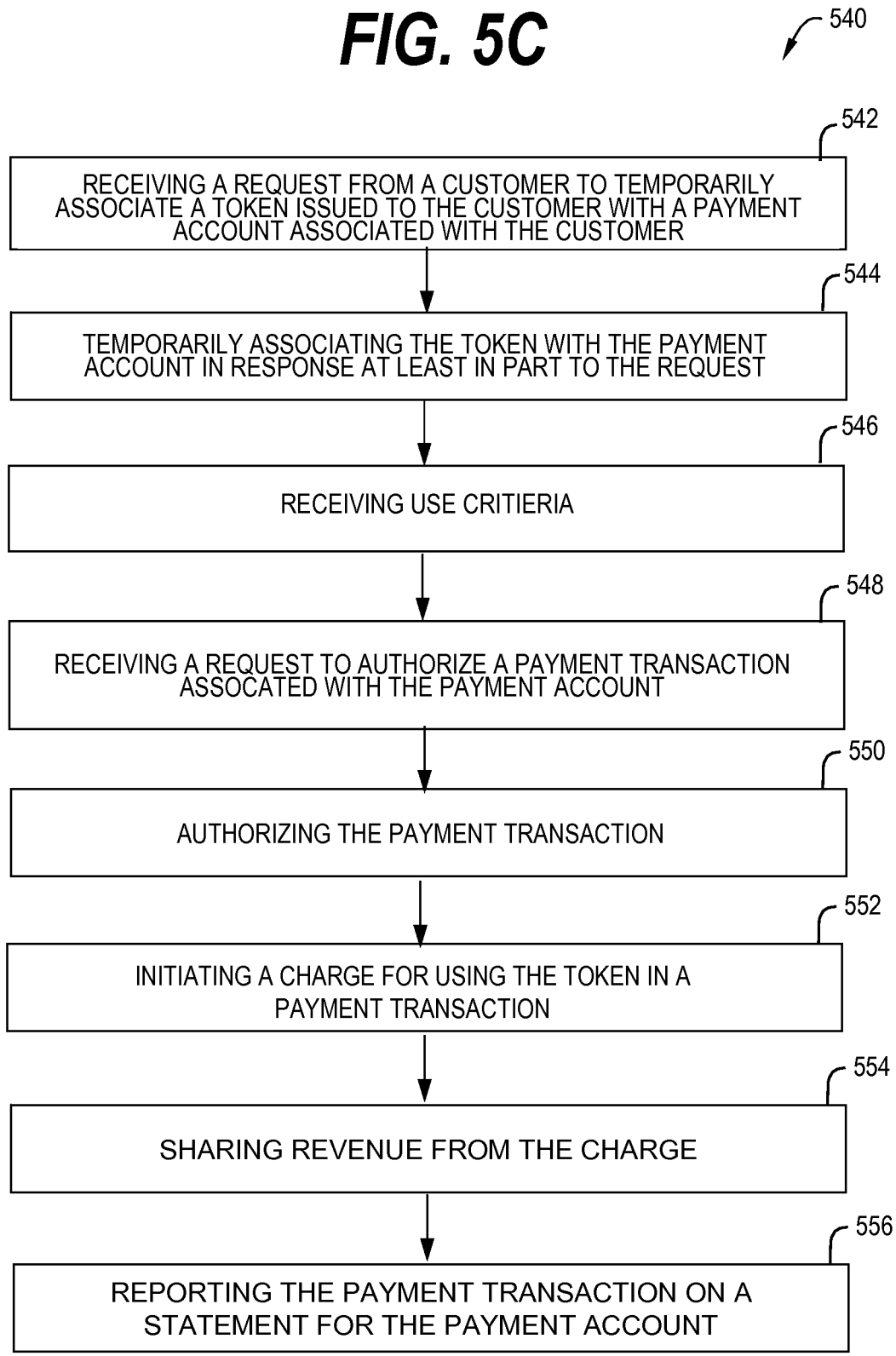

METHODS, APPARATUS AND ARTICLES FOR USE IN ASSOCIATION WITH TOKEN

BACKGROUND

Proximity payment devices are in widespread use. A well known standard for proximity payment devices has been promulgated by MasterCard International Incorporated, the assignee hereof, and is referred to as "PayPass". A proximity payment device often includes a wireless communication interface to transmit a payment account number and/or other information to a point of sale (POS) system. The wireless interface often includes a radio frequency identification circuit (RFID IC) and an antenna to communicate with and/or receive a power signal from the POS system.

Some venues support proximity payment devices as a way to reduce the amount of cash that must be handled by the venue. Unfortunately, some attendees of a venue may not have a proximity payment device and/or other device that allows them to purchase goods and/or services without cash. Thus, a venue that supports proximity payment devices may nonetheless find that it handles more cash than may be desired.

To address the above and further reduce the amount of cash that must be handled, some venues have acquired the ability to incorporate a proximity payment device into a ticket to be issued to a customer and used to enter the venue. The proximity payment device is associated with the customer's payment account and allows the customer to make purchases at the venue without cash.

BRIEF DESCRIPTION OF THE DRAWINGS

FIG. 5A is a flow chart that illustrates a method, according to some embodiments;

FIG. 5C is a flow chart that illustrates a method, according to some embodiments.

DETAILED DESCRIPTION

Notwithstanding the benefit of proximity payment devices, it has been determined that it may be undesirable to incorporate a proximity payment device into a ticket to be issued to a customer.

For example, a person other than the customer may come into possession of the ticket before it reaches the customer and may use or attempt to use the proximity payment device in unauthorized purchase transactions. Some may not be happy with this.

Moreover, if a family or close group of friends attend the venue, it may not be appropriate for each person too carry an identical pre-determined value on their card. However it may also not be acceptable for only one member of the group to be able to purchase goods and services during the event. One member of the group may wish to purchase food and beverage for the whole group for example; however this may require them to collect all the tickets from group members to pay for each meal independently. Equally the cost of a larger ticket purchase (souvenir) may to need to be split over a number of cards if no card has sufficient value to pay for the item outright. Some may not be happy with this.

Consequently, other methods, apparatus and systems to facilitate cashless transactions at a venue are desired.

Figure 1:
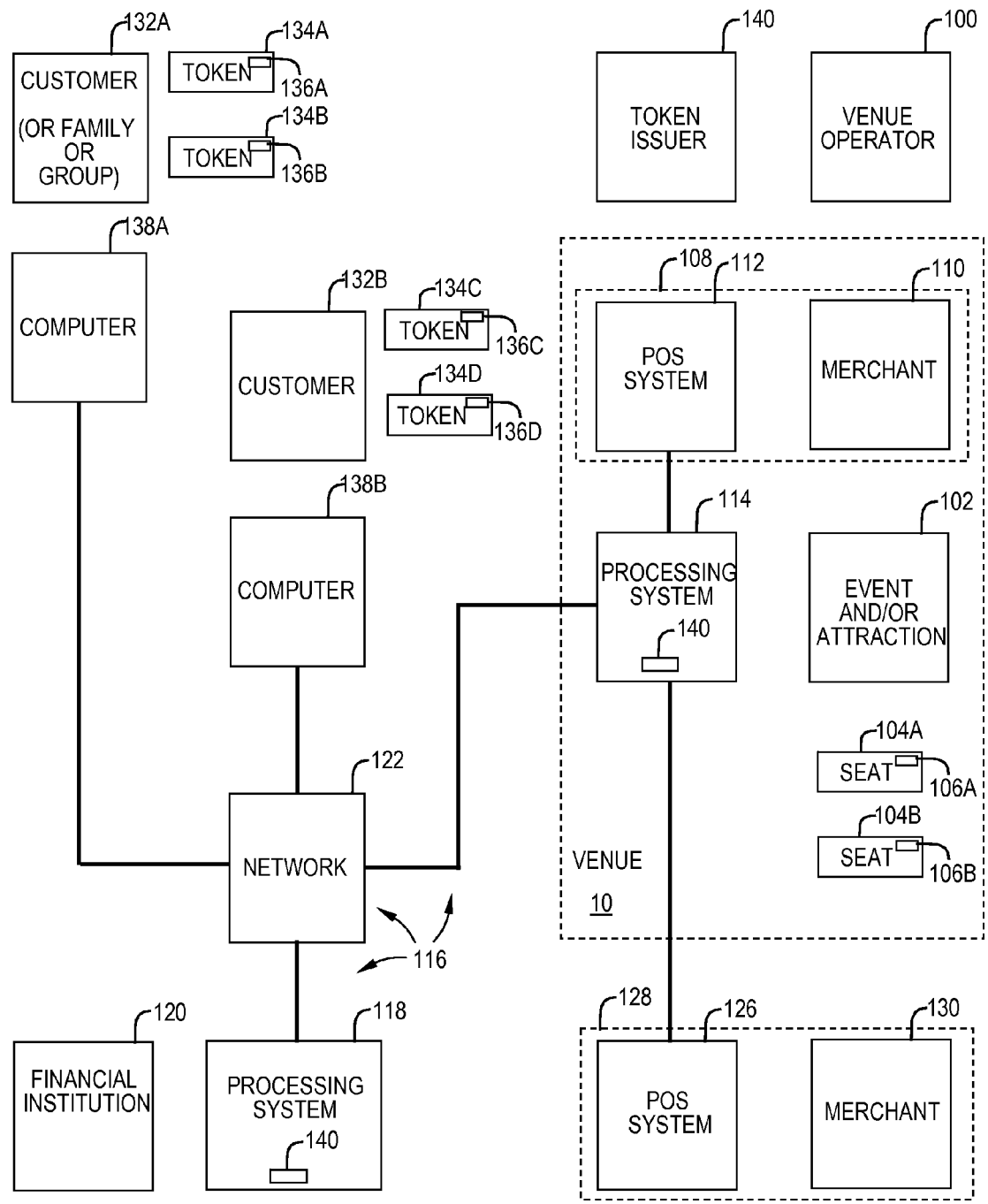
FIG. 1 is a schematic block diagram of a venue and a system, according to some embodiments.

FIG. 1 is a schematic block diagram of a venue and a system that may be used in carrying out cashless transactions at the venue, in accordance with some embodiments.

Referring to FIG. 1, a venue 10 may comprise a stadium, a theme park, a resort, a hotel, (or other man made facility), a city (or other jurisdiction), a property and/or any other type of venue. The venue 10 may be operated by a venue operator 100 and may serve as a location for one or more events and/or attractions 102. An event may comprise a sporting event, a play (or other type of performance), a movie (or other type of showing) and/or any other type of event. An attraction may comprise a theme park ride, an historical item (or other items), food (or other type of goods or services), wildlife, a geological structure and/or any other type of attraction.

The venue 10 may include a plurality of seats, represented by seats 104A-104B. In some embodiments, each of the plurality of seats 104A-104B is associated with a respective one of a plurality of identifiers, represented by identifiers 106A-106B.

The venue 10 may further include concession areas, represented by concession area 108. The concession areas 108 may be operated by one or more merchants, represented by a merchant 110. Point of sale (POS) systems, represented by POS system 112, may be disposed in the concession areas 108. Such POS systems 112 may be coupled to a processing system 114, which may be disposed inside and/or outside of the venue 110.

In some embodiments, processing system 114 is associated with a management entity. In some embodiments, such management entity comprises the venue operator 100 and/or the token issuer 140.

A communication link 116 may couple the processing system 114 to a processing system 118, which may in turn be associated with (e.g., operated by and/or on behalf of) a financial institution 120.

The communication link 116 may comprise any type of communication link, for example, but not limited to wired (e.g., conductors, fiber optic cables) or wireless (e.g., acoustic links, electromagnetic links or any combination thereof including, for example, but not limited to microwave links, satellite links, infrared links), and/or any combinations thereof. A communication link may be public or private, dedicated and/or shared (e.g., a network) and/or any combination thereof. Thus, a communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. In some embodiments, communication link 116 comprises a computer network 122. In some embodiments, the computer network 122 comprises a payment processing network. In some embodiments, one or more portions of a communication link employs a protocol or combination of protocols, for example, but not limited to, the Internet Protocol.

The processing system 114 may also be coupled to POS systems, represented by POS system 126, disposed outside of the venue 10. The POS systems 126 may be disposed in concession areas, represented by a concession area 128, and may be operated by one or more merchants, represented by a merchant 130.

The venue 10 may be attended by customers, represented by customers 132A-132B. The customers 132A-132B may use a plurality of tokens, represented by tokens 134A-134D, in the course of attending the venue 10. In some embodiments, each of the tokens 134A-134D comprises a ticket that entitles a holder to enter the venue 10. One or more of the tokens 134A-134D may entitle a holder to receive one or more other benefits. The other benefits may include a trip on a transit system, a ride in a theme park, and/or food and/or drink from a food and/or drink service.

Each of the plurality of tokens 134A-134D may include an identifier, represented by identifiers 136A-136D, respectively. In some embodiments, each of the identifiers is unique in that it is different than all others of the identifiers 136A-136D. In some embodiments, each of the plurality of tokens 134A-134D includes a device and/or machine readable medium that stores the token's identifier. In some embodiments, the device and/or machine readable medium includes a magnetic strip, a bar code, and/or an integrated circuit. In some embodiments, a bar code comprises a three dimension (3D) bar code. In some embodiments, each of the tokens 134A-134D further includes one or more security features that allow the identity and authenticity of the token to be confirmed. In some embodiments, the tokens may include one or more features that may be utilized to support services such as cardholder age verification and/or restricting entry to the venue 100 (or one or more portions thereof).

A token issuer 140 may issue the tokens 134A-134D to the customers 132A-132B. Unless stated otherwise, the term "issue to" may include, but is not limited to, give to, loan to, rent to, sell to, transfer to and/or provide to. The term "provide to" may include, but is not limited to, hand to and/or send to. The term "send to" may include, but is not limited to, mail to and/or ship to. In some embodiments, a plurality of the tokens, e.g., tokens 134A-134B, are issued to a single customer, family and/or a group, e.g., customer (or family or group) 132A.

In accordance with some embodiments, the tokens 134A-134D are not associated with payment accounts prior to issuing the tokens 134A-134D to the customers 132A-132B. In some embodiments, this helps to reduce the possibility of fraud.

The token issuer 140, venue operator 100 and/or a management entity associated with the processing system 114 may arrange for a customer to have an ability to request that one or more of the tokens 134A-134D issued to the customer be temporarily associated with one or more payment accounts and temporarily usable as payment tokens. In some embodiments, a payment account may comprise any type of payment account. In some embodiments, a payment account may comprise a pre-paid payment account, a debit account or a credit account.

In some embodiments, neither the token issuer 140, the venue operator 100, nor a management entity associated with the processing system 114 are banks. Thus, the token issuer 140 and/or venue operator 100 may contract with the financial institution 120 (or other entity that offers payments accounts), which in turn may provide the customer with the ability to request that one or more of the tokens 134A-134D issued to the customer be temporarily associated with one or more payment accounts and temporarily usable as payment tokens. In some embodiments, the token issuer 140 and/or venue operator 110 may arrange for all of the customers 134A-134D to have such ability.

In some embodiments, the agreement may provide for the tokens 134A-134D to operate in a manner that is the same as and/or similar to a standard bank card or product (e.g. PayPass).

In some embodiments, the financial institution 120 (or other entity that offers payments accounts) is not involved in issuing and/or maintaining the tokens 134A-134D.

Thereafter, a customer issued one or more of the tokens 134A-134D may request that one or more of such tokens be temporarily associated with a payment account and temporarily usable as a payment token. In some embodiments, the customer supplies the request via a website, a telephone, email, mail, in person, and/or using any other method. If the customer supplies the request via a website and/or email, the customer may employ one of computers 138A-138B, which may be coupled to the processing system 118. The one of computers 138A-138B may execute a browser program and/or email program, receive signals from one or more input devices (e.g., a mouse and/or keyboard), and in response at least in part thereto, forward the request via the website and/or email. The request may be forwarded to the processing system 118.

The customer may further supply criteria for using the token in a payment transaction, sometimes referred to as use criteria. In some embodiments, the customer supplies the use criteria via a website, a telephone, email, mail, in person, and/or any other method. The use criteria may be forwarded to the processing system 118.

The processing system 118 and/or financial institution 120 may receive the request and may temporarily associate the token with the payment account in response at least in part to the request. This may include defining a mapping that associates the token's identifier with the payment account. The mapping may be supplied to the processing system 114.

In some embodiments, the processing system 118 may temporarily associate the token with the payment account only if the customer is associated with the payment account. Unless stated otherwise, the customer is associated with the payment account if the customer is an account holder of such payment account and/or otherwise authorized to access and/or use the payment account.

In some embodiments, temporarily associating the token with a payment account comprises associating the token with the payment account for a predetermined time period. In some embodiments, the predetermined time period is based at least in part on the date and time of an event at the venue.

The processing system 118 and/or financial institution 120 may further receive the use criteria.

In some embodiments, one or more of the other entities 100, 140, and/or one or more of the other systems 112, 114 may receive the request and/or use criteria. In some such embodiments, the one or more other entities 100, 140, and/or systems 112, 114 may temporarily associate the token with the payment account. In some embodiments, the one or more other entities 100, 140, and/or systems 112, 114 may instead forward the request to the financial institution 120 and/or processing system.

Thereafter, the customer may use the token in a payment transaction. In some embodiments, the customer carries this out by presenting the token to one of the POS systems 112, 126. In some embodiments, the POS system thereafter receives the token's identifier. As stated above, in some embodiments, each of the plurality of tokens 134A-134D includes a device and/or machine readable medium that stores the token's identifier. In some embodiments, the device and/or machine readable medium includes a magnetic strip, a bar code, and/or an integrated circuit. In some embodiments, one or more portions of the "PayPass" standard are employed.

The POS system may utilize one or more security features (if included) of a token to confirm the identity and/or authenticity of the token.

The POS system may thereafter supply the identifier to the processing system 114. In some embodiments, the processing system 114 determines a payment account associated with the identifier. In some embodiments, the payment account is based at least in part on the identifier and a mapping. The mapping may comprise the mapping 140.

In some embodiments, the payment account number comprises a PAN number.

In some embodiments, the processing system 114 may confirm the identity and/or authenticity of the token prior to determining the payment account. This may be in addition to and/or in lieu of confirmation of identity and/or authenticity by the POS system.

In some embodiments, the identifier itself may be a payment account number.

The processing system 114 may thereafter initiate a payment transaction associated with the payment account. This may include communicating with a payment card system to initiate a payment transaction against the payment account temporarily associated with the token. In some embodiments, the payment card system includes the processing system 118.

In some embodiments, the processing system 114 routes the payment account number and data indicative of the transaction to an issuer of the payment account associated with the token. In some embodiments, the issuer of the payment account is the financial institution 120.

The processing system 118 may receive the request to authorize a payment transaction associated with the payment account. The processing system 118 may thereafter determine whether to authorize the payment transaction. In some embodiments, this determination is based at least in part on whether the use criteria is satisfied.

If the payment transaction is authorized, the processing system 118 may provide an authorization. In some embodiments, the authorization is supplied via a payment card system.

In some embodiments, an attendee may decide to attend an event carrying only the token that has been temporarily associated with a payment account. Thus, in some embodiments, the attendee's wallet, purse, cash and/or normal payment cards may be left at home.

In some embodiments, a pre-determined amount is transferred to such token from the payment account. Any balance remaining after the event (and/or after the token is no longer associated with the payment account) may be transferred back to the original funding source. In some embodiments, such transfer is automatic.

As stated above, in some embodiments, the tokens 134A-134D are only temporarily associated with the payment accounts, and thus the tokens 134A-134D may be disposable and not intended to completely replace debit cards and/or credit cards.

In some embodiments, an entity that provides a service is compensated for the service provided by that entity. In some embodiments, each entity that provides a service is compensated for the service provided by that entity.

In some embodiments, the financial institution 120 or other entity may initiate a charge for one or more services performed. In some embodiments, revenue from the charge is shared between two or more entities. In some embodiments, such entities include the venue operator 100, the token issuer 140 and/or the financial institution 120. In some embodiments, the portion of the revenue received by each particular entity is based on the one or more services provided by that entity. In some embodiments, each entity that performs one or more of the services described herein receives a portion of the revenue. In some embodiments, the portion of the revenue received by each particular entity is based on the one or more services provided by that entity.

It should be noted that if the tokens 134A-134D do not operate in a manner that is the same as and/or similar to a standard bank card or product (e.g. PayPass), the tokens 134A-134D may be usable only at designated locations.

In some embodiments, it may be desirable to associate two or more tokens, e.g., tokens 134A-134B, of the plurality of tokens, e.g. tokens 134A-134B, issued to a single customer, family and/or group, e.g., customer (or family or group) 132A, with the same payment account. (If issued to a single customer, e.g., customer 132A, the customer may distribute one or more token, e.g., token 134B, of the plurality of tokens, e.g., tokens 134A-134B, to one or more other members of the customer's family and/or group.) In some embodiments, this increases the usefulness (of the tokens) to the family and/or group. In some embodiments two or more tokens, e.g., tokens 134A-134B, of the plurality of tokens, e.g. tokens 134A-134B, issued to the customer, family and/or group, e.g., customer (or family or group) 132A, may share a pre-determined amount from the same payment account. In some embodiments, this further increases the usefulness (of the tokens) to a family and/or group.

In some embodiments, the system may be used to limit the amount that a family and/or group may spend at, and/or in association with, an event and/or attraction, and may also limit their exposure to theft. In some embodiments, this may be particularly helpful if consumption of alcoholic beverages is expected.

In some embodiment, additional services may be offered by the token issuer 140, venue operator 100 and/or management entity. In some embodiments, the management entity may offer immediate replacement of faulty and/or lost tokens within the venue. In some embodiments, the management entity may utilize one or more of features (if included) of the tokens to verify cardholder age and/or restrict entry to the venue (or one or more portions thereof). In some embodiments, the management entity may provide services to authorize transactions (or consolidation of multiple small value transactions) on site to minimize transaction times and acquiring costs within the venue. In some embodiments, one or more services provided by the management entity and/or one or more of the other entities may be designed to provide 'high availability' of systems during an event. In some embodiments, the POS systems 112, 126, the processing system 114, the processing system 118, and/or one or more portions of the communication link 116 may provide greater bandwidth during an event than at one or more other times.

Figure 2:
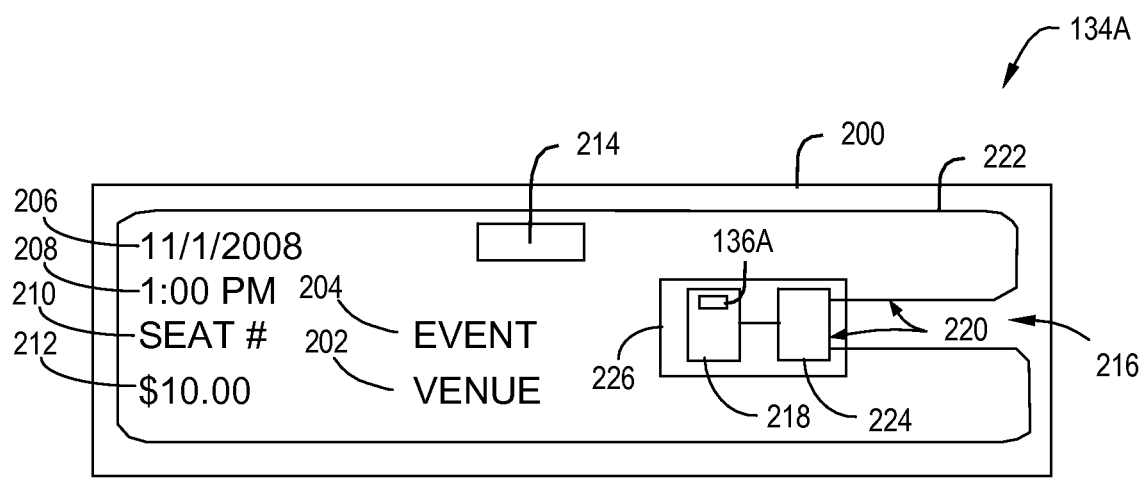
FIG. 2 is a part schematic plan view, part schematic block diagram of a token, according to some embodiments.

FIG. 2 is a part schematic plan view, part schematic block diagram, of one of the plurality of token 134A-134D, e.g., token 134A, according to some embodiments. Referring to FIG. 2, in accordance with some embodiments, the token 134A includes a body 200 and regions 202-214. The body 200 may be generally card shaped. Regions 202-208 may include indicia identifying a venue, an event and/or attraction, a date of the event and/or attraction, and a time of the event and/or attraction, which collectively define the venue and event and/or attraction for which the holder is entitled to enter the venue.

Regions 210-212 may include indicia identifying a seat associated with the token and a cost of the token. Region 214 may include one or more brand and/or logo of an issuer or a payment card association and/or one or more brand and/or logo thereof.

The token 134A may further include a device 216 to store the identifier 136A and/or supply the identifier 136A to a POS system 112, 126. In some embodiments, the device 216 includes a magnetic strip, a bar code, and/or an RFID IC or other integrated circuit. In the illustrated embodiment, the device 216 includes control/storage circuitry 218 and a wireless communication interface 220. The control/storage circuitry 218 may store the identifier 136A (and/or other information to be supplied to the POS system 112, 126). The wireless communication interface 220 may transmit the identifier 136A (e.g., in the form of signals representing the identifier 136A) and/or other information to the POS system 112, 126 and may receive signals from the POS system 112, 126. The signals received from the POS system 112, 126 may include an interrogation signal, a power signal and/or other signals.

The control storage circuitry 218 may comprise any type of control/storage circuitry. For example, the control/storage circuitry 218 may be programmable or non programmable, general purpose or special purpose, dedicated or non dedicated, distributed or non distributed, shared or not shared, and/or any combination thereof. Control/storage circuitry may include, but is not limited to, hardware, software, firmware, and/or any combination thereof. Hardware may include, but is not limited to off the shelf integrated circuits, custom integrated circuits and/or any combination thereof. In some embodiments, control/storage circuitry comprises a microcontroller and/or any other type of microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. Control/storage circuitry may employ continuous signals, periodically sampled signals, and/or any combination thereof. If control/storage circuitry is distributed, two or more portions of the control/storage circuitry may communicate with one another through a communication link.

In some embodiments, the control/storage circuitry 218 comprises a simple memory device capable only of responding to a pre-defined set of commands. In some other embodiments, the control/storage circuitry 218 comprises a secure microcontroller capable of executing a pre-defined program.

The wireless communication interface 220 may comprise an antenna 222 and transmit/receive circuitry 224. The antenna 222 may be configured to transmit and receive radio frequency (RF) signals and may comprise a loop antenna and/or any other suitable configuration. The transmit/receive circuitry 224 may be coupled between the antenna 222 and the control/storage circuitry 218.

In some embodiments, the control/storage circuit 218 and the transmit/receive circuitry 224 are disposed in a single integrated circuit 226. In some embodiments, the single integrated circuit 226 comprises an RFID IC. Unless stated otherwise, the term RFID is not limited to a specific type of RFID. In some embodiments, an RFID is a simple memory device capable only of responding to a pre-defined set of commands. In some other embodiments, an RFID comprises a microcontroller capable of executing a program. In some embodiments, an RFID IC comprises an IC that uses contactless technology, such as, for example, as specified in international standard ISO/IEC 14443. Some embodiments may include additional features and/or other configurations altogether.

In operation, wireless signals (e.g., RF signals) may be received by the antenna 222 and supplied to the transmit/receive circuitry 224, which in response may provide signals that are supplied to the control/storage circuitry 218. The control/storage circuitry 218 may also provide signals that are supplied to the transmit/receive circuitry 224, which in response may provide signals that are supplied to the antenna 222 and transmitted thereby.

In some embodiments, device 216 is supported by the body 200. Unless stated otherwise, the term "supported by" may include but is not limited to partially, and/or entirely, disposed on, disposed in, mounted on, mounted in, installed on, installed in, contained in and/or embedded in.

In some embodiments, the device 216 is the same as and/or similar to devices used to store account information and perform wireless communication in proximity payment devices.

In some embodiments, the device 216 operates in accordance with the above-mentioned "PayPass" standard.

The technology and security used in the token 134A may be the same as, or different from, that used in other types of payment devices of the same brand and/or payment scheme.

Figure 3A:
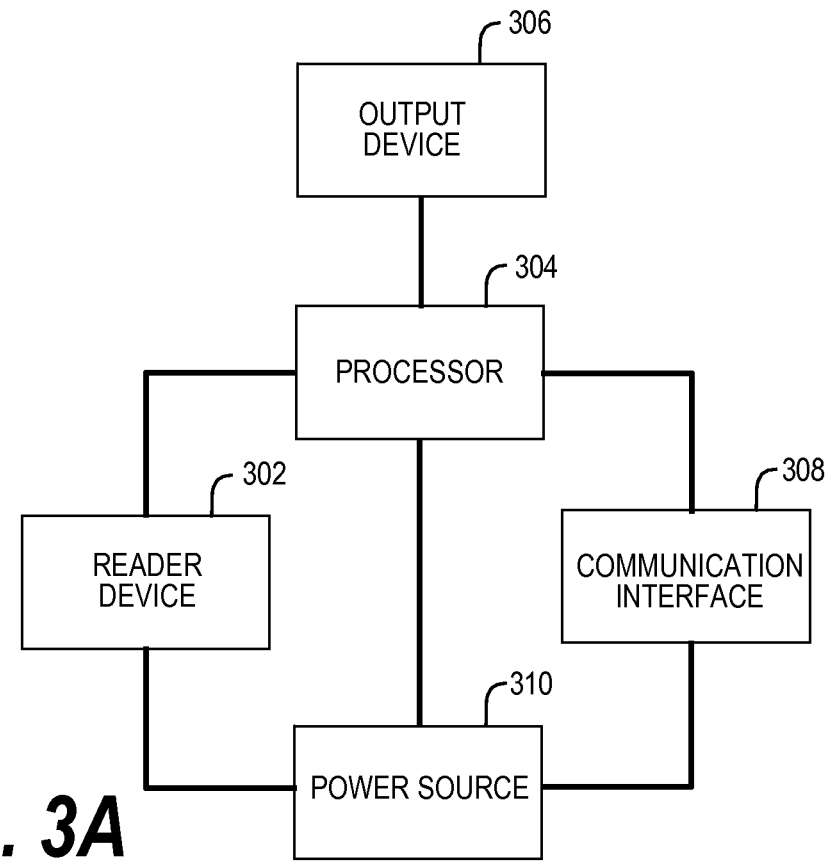
FIG. 3A is a schematic block diagram of a point of sale system, according to some embodiments.

FIG. 3A is a schematic block diagram of one of the POS systems 112, 126, according to some embodiments. Referring to FIG. 3A, in accordance with some embodiments, the POS system 106 may include a reader device 302, a processor 304, an output device 306, a communication interface 308 and a power supply 310.

The reader device 302 receives the token identifier from the token. If the identifier is stored in a magnetic strip, the reader device 302 may comprise a magnetic strip reader. If the identifier is stored in a bar code, the reader device 302 may comprise a bar code reader. If the identifier is stored in an integrated circuit, the reader device 302 may comprise a proximity coupling device. In some embodiments, the reader device 302 comprises a proximity coupling device to perform wireless communication with the device 216 (FIG. 2) that stores the identifier 136A of token 134A. In some embodiments, the reader device 302 comprises a proximity coupling device that is the same as and/or similar to proximity coupling devices used to receive account information from proximity payment devices.

The processor 304 may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the processor may communicate with one another through a communication link.

In operation, the reader device 302 may receive the identifier (e.g., in the form of signals that represent the identifier) from a device and/or machine readable medium storing such identifier, and/or transmit signals to such device and/or machine readable medium. The reader device 302 may also receive signals from the processor 304 and/or transmit signals to the processor 304. The processor 304 may receive signals from and/or transmit signals to the reader device 302, the output device 304 and/or the communication interface 310.

Although the reader device 302, the processor 304, the output device 306 and the communication interface 310 are shown separate from one another, in some embodiments, the reader device 302, the processor 304, the output device 306 and/or the communication interface 310 may share one or more circuits and/or other components.

The power source 310 may be coupled (directly and/or indirectly) and/or supply power (directly and/or indirectly) to the reader device 302, the processor 304, the output device 306, and/or the communication interface 308.

Figure 3B:
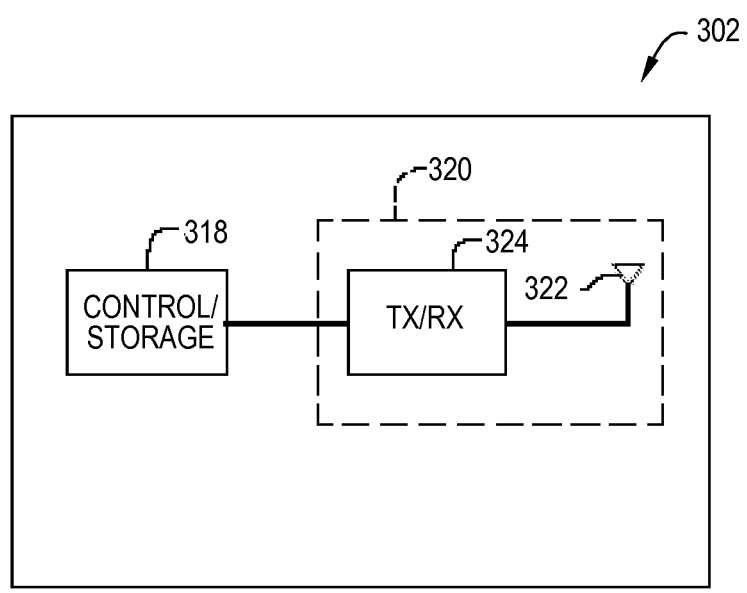
FIG. 3B is a schematic block diagram of a reader device, according to some embodiments.

FIG. 3B is a schematic block diagram of a reader device 302, according to some embodiments. Referring to FIG. 3B, in accordance with some embodiments, the reader device 302 include may include control/storage circuitry 318 and a wireless communication interface 320.

The control storage circuitry 318 may comprise any type of control/storage circuitry. In some embodiments, the control/storage circuitry 318 comprises a simple memory device capable only of responding to a pre-defined set of commands. In some other embodiments, the control/storage circuitry 318 comprises a secure microcontroller capable of executing a pre-defined program.

The wireless communication interface 320 may comprise an antenna 322 and transmit/receive circuitry 324. The antenna 322 may be configured to transmit and receive radio frequency (RF) signals and may comprise a loop antenna and/or any other suitable configuration. The transmit/receive circuitry 324 may couple the antenna 322 to the control/storage circuitry 318.

The wireless communication interface 320 may allow the reader device 302 to transmit signals to and/or to receive signals from the device 216 (FIG. 2) that stores the identifier 136A of token 134A.

In some embodiments, device 216 is within range of the reader device 302 if a wireless communication interface 220 of the device 102 is positioned in a field generated by the wireless communication interface 320 of the reader device 302.

In operation, wireless signals (e.g., RF signals) may be received by the antenna 322 and supplied to the transmit/receive circuitry 324, which in response may provide signals that are supplied to the control/storage circuitry 318. The control/storage circuitry 318 may also provide signals that are supplied to the transmit/receive circuitry 324, which in response, may provide signals that are supplied to the antenna 322 and transmitted thereby.

In some embodiments, the control/storage circuit 318 and the transmit/receive circuitry 324 are disposed in a single integrated circuit.

In some embodiments, the control/storage circuit 318 and the transmit/receive circuitry 324 are disposed in an IC that uses NFC technology, such as, for example, an NFC IC compliant with ISO/IEC 18092/ECMA-340 or ISO/IEC 21481/ECMA-352.

In some embodiments, the control/storage circuitry 318 and/or the wireless communication interface 320 are the same as and/or similar to control/storage circuitry and/or a wireless communication interface used to receive account information from proximity payment devices.

In some embodiments, the control/storage circuitry 318 and/or the wireless communication interface 320 are configured to allow the proximity coupling device 302 to operate in accordance with the above-mentioned "PayPass" standard.

Figure 4:
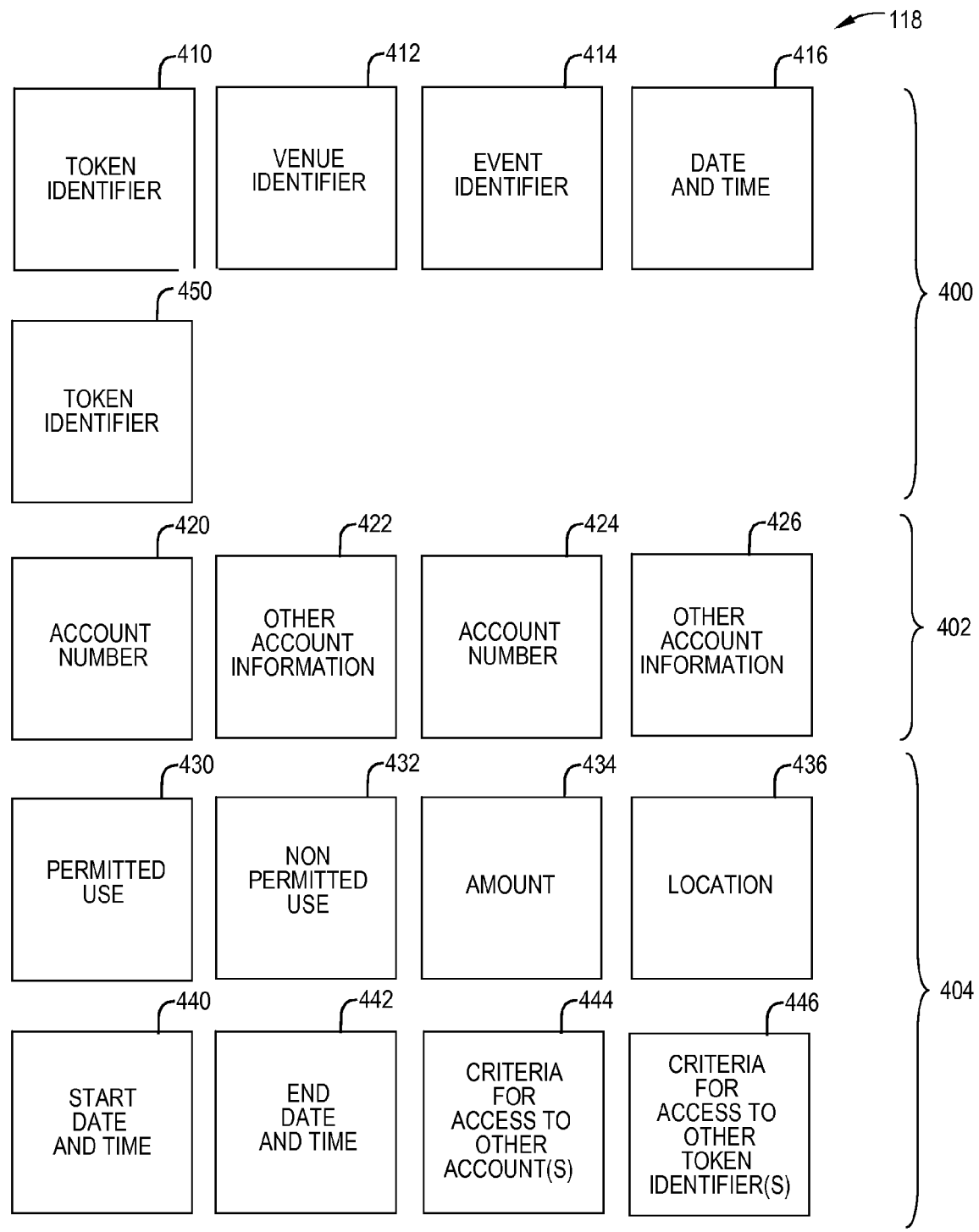
FIG. 4 is a schematic block diagram of a portion of a processing system, according to some embodiments.

FIG. 4 is a schematic block diagram of data that may be stored in the processing system 118, in accordance with some embodiments. Referring to FIG. 4, in accordance with some embodiments, the processing system 118 may include token data 400, account data 402 and use criteria 404.

The token data 400 may include a token identifier 410, a venue identifier 412, an event identifier 414, and a date and a time 416. In some embodiments, the token identifier 410, the venue identifier 412, the event identifier 414, the date and time 416 are combined into a single identifier. The token data 402 may further include a second token identifier 450.

The account data 402 may include an account number 420 associated with a payment account and other account information 422. In some embodiments, the other account information 422 includes an expiration date associated with the payment account.

The account data 402 may further include a second account number 424 associated with a second payment account and other account information 426. In some embodiments, the other account information 426 includes an expiration date associated with the second payment account.

The use criteria 404 may include (i) data 430 indicative of goods and/or services that may be purchased using the token, (ii) data 432 indicative of goods and/or services that may not be purchase using the token, (iii) data 434 indicative of an amount that may be spent using the token, (iv) data 436 indication of a location at which purchases may be made using the token, (v) data 440 indicative of a start date and time to allow purchases using the token, (vi) data 442 indicative of an end date and time to allow purchases using the token, (vii) data 444 indicative of criteria for using the token to make purchases associated with the second payment account, and (viii) data 446 indicative of criteria for using the token to make purchases associated with a payment account temporarily associated with the second token.

In some embodiments, the token is temporarily associated with payment account from the start date and time until the end date and time. In some embodiments, the token is not associated with the payment account until the start date and time. In some embodiments, the token is no longer associated with the payment account after the end date and time.

In some embodiments, one, some or all of the use criteria data elements have a default value when the token is initially associated with a payment account. In some embodiments, the default value of a data element is defined by the customer. In some embodiments, the customer has the ability to change the value of one or more of the data elements.

In some embodiments, the token data 400, the account data 402 and/or the use criteria are stored in a single record.

In some embodiments, one or more of the data elements shown in FIG. 4 are not used.

In some embodiments, the data 432 may indicate that alcohol may not be purchased using the token.

In some embodiments, the data 436 indicates that purchases may be made only at locations in the venue. In some embodiments, the data 436 indicates that purchases may be made only at locations in the venue and locations within one block of the venue. In some embodiments, the data 436 indicates that purchases may be made only at locations in the venue and locations within one mile of the venue.

In some embodiments, the data 440 indicates that the start date is the same date as the date of the event, one day prior to the date of the event or one week prior to the date of the event.

In some embodiments, the data 442 indicates that the end date is the same date as the date of the event, one day after the date of the event or one week after the date of the event.

In some embodiments, the start date and end date are the same as the date of the event. In some such embodiments, the start time may be the same as the start time of the event, one hour before the start time of the event, or any time less than three hours before the start time of the event. The end time may be the same as the end time of the event, one hour after the end time of the event, or any time less than three hours after the end time of the event.

In some embodiments, the tokens 134A-134D are only temporarily associated with the payment accounts, and thus the tokens 134A-134D may be disposable and not intended to completely replace debit cards and/or credit cards.

In some embodiments, two or more tokens, e.g., tokens 134A-134B, of the plurality of tokens, e.g. tokens 134A-134B, issued to the customer, family and/or group, e.g., customer (or family or group) 132A, may be associated with the same payment account. In some embodiments, this increases the usefulness (of the tokens) to the family and/or group. In some embodiments two or more tokens, e.g., tokens 134A-134B, of the plurality of tokens, e.g. tokens 134A-134B, issued to the customer, family and/or group, e.g., customer (or family or group) 132A, may share a pre-determined amount from the same payment account. In some embodiments, this further increases the usefulness (of the tokens) to a family and/or group. In some embodiments, the system may be used to limit the amount that a family and/or group may spend at, and/or in association with, an event and/or attraction, and may also limit their exposure to theft. In some embodiments, this may be particularly helpful if consumption of alcoholic beverages is expected.

In some embodiments, the criteria for using one token, e.g., token 134A, of the plurality of tokens, e.g. tokens 134A-134B, issued to the customer, family and/or group, e.g., customer (or family or group) 132A, may be different than the criteria for using another token, e.g., token 134B, of the plurality of tokens, e.g. tokens 134A-134B, issued to the customer, family and/or group, e.g., customer (or family or group) 132A. In some embodiments, for example, it may be expected that one of the tokens will be used by an adult in the family and/or group and the other token may be used by a child in the family and/or group.

In some embodiments, the processing system 118 may include similar data for one, some or all other tokens of the plurality of tokens 134A-134D.

FIG. 5A is a flow chart 500 of a method according to some embodiments. In some embodiments, one or more portions of the method may be performed in association with one or more token, e.g., token 134A, of the plurality of tokens 134A-134D. In some embodiments, one or more portions of the method may be performed by a token issuer 140 (FIG. 1). The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 502, the method may include providing a token having an identifier. In some embodiments, this includes defining an identifier to be associated with the token and storing the identifier on the token. In some embodiments, storing includes storing the identifier on a magnetic strip, a bar code and/or in control/storage circuitry 218 (FIG. 2).

In some embodiments, other token data is also defined and stored on the token. In some embodiments, the other token data includes a venue identifier, an event identifier, a date and/or a time. In some embodiments, the token identifier, the venue identifier, the event identifier, the date and/or the time are combined into a single identifier. If tokens are processed as a batch, one or more portions of the token data may be the same for all tokens in the batch. In some embodiments, one or more portions of the token data are printed on the token.

In some embodiments, one or more portions of the defining, storing and/or printing are carried out in the course of fabricating the token. In some embodiments, one or more portions of the defining, storing and/or printing may be the same as and/or similar to one or more portions of one or more methods used in personalization and/or pre-personalization of a proximity payment card. In some embodiments, one or more portions of the defining, storing and/or printing is carried out using contactless programming equipment that is the same as and/or similar to contactless programming equipment commonly used to program proximity payment cards, such as for example, a model 9000 available from Datacard Group, Minnetonka, Minn.

At 504, the method may further include issuing the token to a customer. In some embodiments, issuing the token to a customer comprises giving, loaning, renting, selling, transferring and/or providing the token to the customer. Providing the token to the customer may include handing and/or sending the token to the customer. Sending the token to the customer may include mailing the token to the customer.

At 506, the method may further include arranging for the customer to have an ability to request that the token be temporarily associated with a payment account and temporarily usable as a payment token. In some embodiments, this includes contracting with a financial institution to arrange for the financial institution to provide the customer with the ability to request that the token be temporarily associated with a payment account and temporarily usable as a payment token.

The method may further include printing a notice regarding the arrangement. The notice may be issued to the customer.

At 508, the method may further include receiving a mapping associating the identifier with a payment account. In some embodiments, the mapping comprises a mapping defined by a financial institution that provides the customer with the ability to request that the token be temporarily associated with a payment account and temporarily usable as a payment token.

At 510, the method may further include receiving the identifier at a POS system. In some embodiments, the identifier is supplied by a token presented to the POS system. In some embodiments, one or more portions of the "PayPass" standard are employed. For example, the token may be presented to the proximity coupling device and the proximity coupling device may transmit an interrogation signal in response at least thereto. The token may receive the interrogation signal via an antenna 206 (FIG. 2A). The interrogation signal may cause the circuitry of the token to be powered-up. For example, the token may include circuitry to rectify the received interrogation signal to generate DC power that may be used to power control/storage circuitry 218 (FIG. 2) and transmit/receive circuitry 224 (FIG. 2).

The token may transmit one or more signals to the proximity coupling device in response to the interrogation signal. The one or more signals may be transmitted via the antenna 222 (FIG. 2) and may include token data and/or other information required for interaction with the proximity coupling device. In some embodiments, the token may transmit the token data and/or other information after a handshake procedure or the like with the POS system.

In some embodiments, a token is presented to the proximity coupling device by positioning the token within wireless communication range of the proximity coupling device. In some embodiments, the token is presented to the proximity payment device by positioning the token in physical contact with, and/or by tapping a portion of the token on, the proximity coupling device.

At 512, the method may further include determining the payment account associated with the identifier based at least in part on the mapping.

At 514, the method may further include initiating a payment transaction associated with the payment account. This may include communicating with a payment card system to initiate a payment transaction against the payment account temporarily associated with the token. In some embodiments, the payment card system includes the processing system 118 (FIG. 1).

At 515, the method may further include printing a receipt for the payment transaction.

At 516, the method may further include initiating a charge for initiating the payment transaction.

At 518, the method may further include sharing revenue from the charge for initiating the payment transaction. The revenue may be shared between two or more entities. In some embodiments, the two or more entities include the venue, the issuer of the token and/or the financial institution. In some embodiments, each entity receives a portion of the revenue, the portion being based on one or more services provided by that entity.

In some embodiments, the method may further include displaying an account balance associated with the payment account.

Figure 5B:
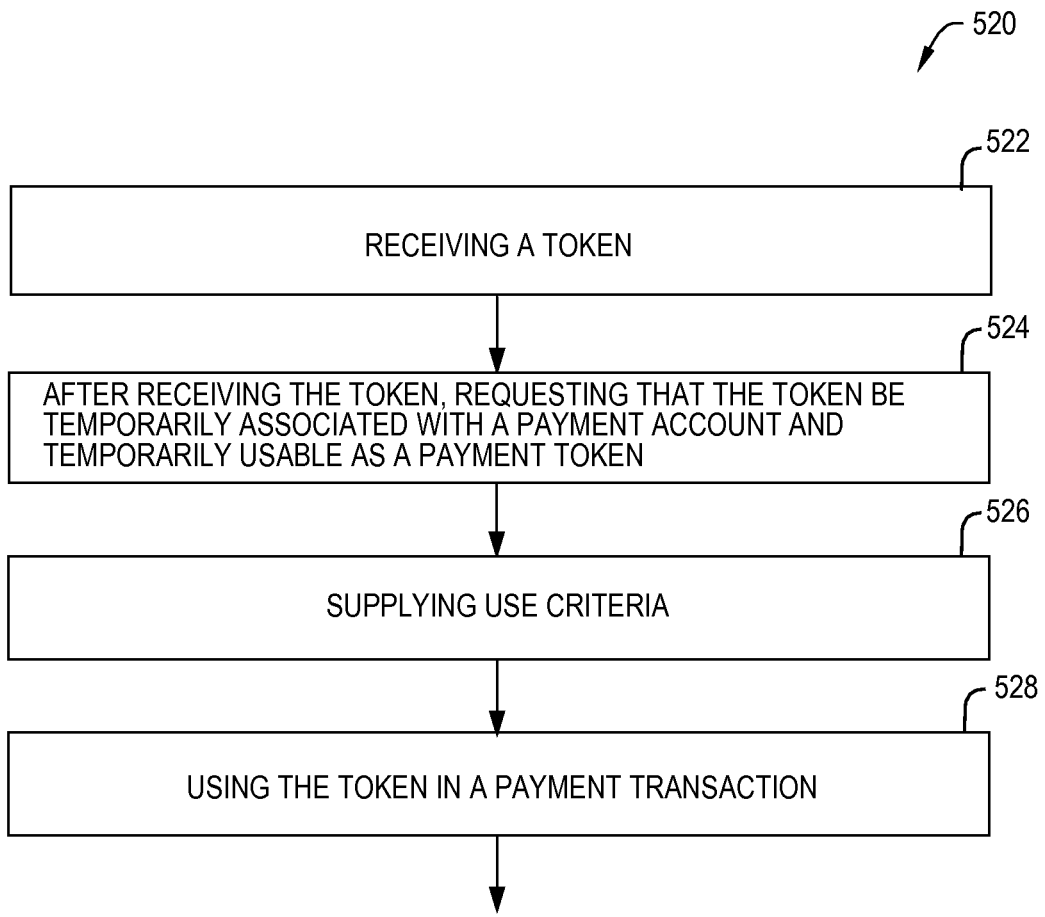
FIG. 5B is a flow chart that illustrates a method, according to some embodiments.

FIG. 5B is a flow chart 520 of a method according to some embodiments. In some embodiments, one or more portions of the method may be performed by a customer, e.g., customer 132A (FIG. 1). In some embodiments, one or more portions of the method may be performed in association with one or more token, e.g., token 134A, of the plurality of tokens 134A-134D, the POS systems 112, 126 the processing system 114 and/or the processing system 118 (FIG. 1).

At 522, the method may include receiving the token. In some embodiments, the token comprises the token issued at 504 of the flow chart 500 (FIG. 5A).

At 524, the method may further include, after receiving the token, requesting that the token be temporarily associated with a payment account and temporarily usable as a payment token. In some embodiments, the request is made via a website, a telephone, email, mail, in person and/or any other method.

In some embodiments, the method may further include requesting that a second token be temporarily associated with a payment account and temporarily usable as a payment token. In some embodiments, the payment account associated with the second token may be the same payment account as is associated with the first token.

As stated above, in some embodiments, a plurality of the tokens, e.g., tokens 134A-134B, are issued to a single customer, family and/or a group, e.g., customer (or family or group) 132A. It may be desirable to associate two or more tokens, e.g., tokens 134A-134B, of the plurality of tokens, e.g. tokens 134A-134B, issued to the customer, family and/or group, e.g., customer (or family or group) 132A, with the same payment account. In some embodiments, this increases the usefulness (of the tokens) to the family and/or group. In some embodiments two or more tokens, e.g., tokens 134A-134B, of the plurality of tokens, e.g. tokens 134A-134B, issued to the customer, family and/or group, e.g., customer (or family or group) 132A, may share a pre-determined amount from the same payment account. In some embodiments, this further increases the usefulness (of the tokens) to a family and/or group. In some embodiments, the system may be used to limit the amount that a family and/or group may spend at, and/or in association with, an event and/or attraction, and may also limit their exposure to theft. In some embodiments, this may be particularly helpful if consumption of alcoholic beverages is expected.

At 526, the method may further include supplying use criteria. In some embodiments, this is performed directly and/or indirectly, by the account holder and/or the customer, e.g., customer 132A. In some embodiments, the account holder and/or customer carries this out via a website, a telephone, email, mail in person and/or any other method. In some embodiments, default use criteria is supplied by another entity and/or a processing system.

At 528, the method may further include using the token in a payment transaction. In some embodiments, this includes presenting the token presented to the POS system. In some embodiments, a payment transaction is carried out as described above.

In some embodiments, the token may be selectively enabled/disabled in order to enable and/or disable operation of the token.

FIG. 5C is a flow chart 540 of a method according to some embodiments. In some embodiments, one or more portions of the method may be performed by the financial institution 120 (FIG. 1). In some embodiments, one or more portions of the method may be performed in association with one or more token, e.g., token 134A, of the plurality of tokens 134A-134D, the POS systems 112, 126 and/or the processing system 118 (FIG. 1).

At 542, the method may include receiving a request from a customer to temporarily associate a token issued to the customer with an account associated with the customer.

In some embodiments, the account holder and/or customer supplies the request via a website, a telephone, email, mail, in person and/or any other method.

At 544, the method may further include temporarily associating the token with the payment account in response at least in part to the request. This may include defining a mapping that associates token data with account data.

In some embodiments, the method may further include reporting the temporary association on a statement for the payment account. In some embodiments, the statement for the payment account is issued to the customer.

At 546, the method may further include receiving use criteria. In some embodiments, receiving use criteria comprises receiving the use criteria via a website, a telephone, and/or mail.

In some embodiments, the use criteria is supplied, directly and/or indirectly, by the account holder and/or customer. In some embodiments, the account holder and/or customer supplies the use criteria via a website, a telephone, email, mail, in person and/or any other method.

At 548, the method may further include receiving a request to authorize a payment transaction associated with the payment account. In some embodiments, the payment account is the payment account temporarily associated with the token. In some embodiments, the request is supplied via a payment card system. In some embodiments, the payment card system includes the processing system 118 (FIG. 1).

At 550, the method may further include authorizing the payment transaction. In some embodiments, the authorization is supplied via a payment card system. In some embodiments, the payment card system includes the processing system 118 (FIG. 1).

At 552, the method may further include initiating a charge for performing one or more portions of the payment transaction.

At 554, the method may further include sharing revenue from the charge for performing one or more portions of the payment transaction. The revenue may be shared between two or more entities. In some embodiments, the two or more entities include the venue, the issuer of the token and/or the financial institution. In some embodiments, each entity receives a portion of the revenue, the portion being based on one or more services provided by that entity.

At 556, the method may further include reporting the payment transaction on a statement for the payment account.

In accordance with some embodiments, a token may include a body, an RFID IC and an antenna. The body may comprise a plastic and/or paper material and may have a generally rectangular card shape. The RFID IC may include control/storage circuitry and transmit/receive circuitry. The RFID IC may further include contacts. Two of the contacts may be electrically connected to the antenna.

Figure 6:
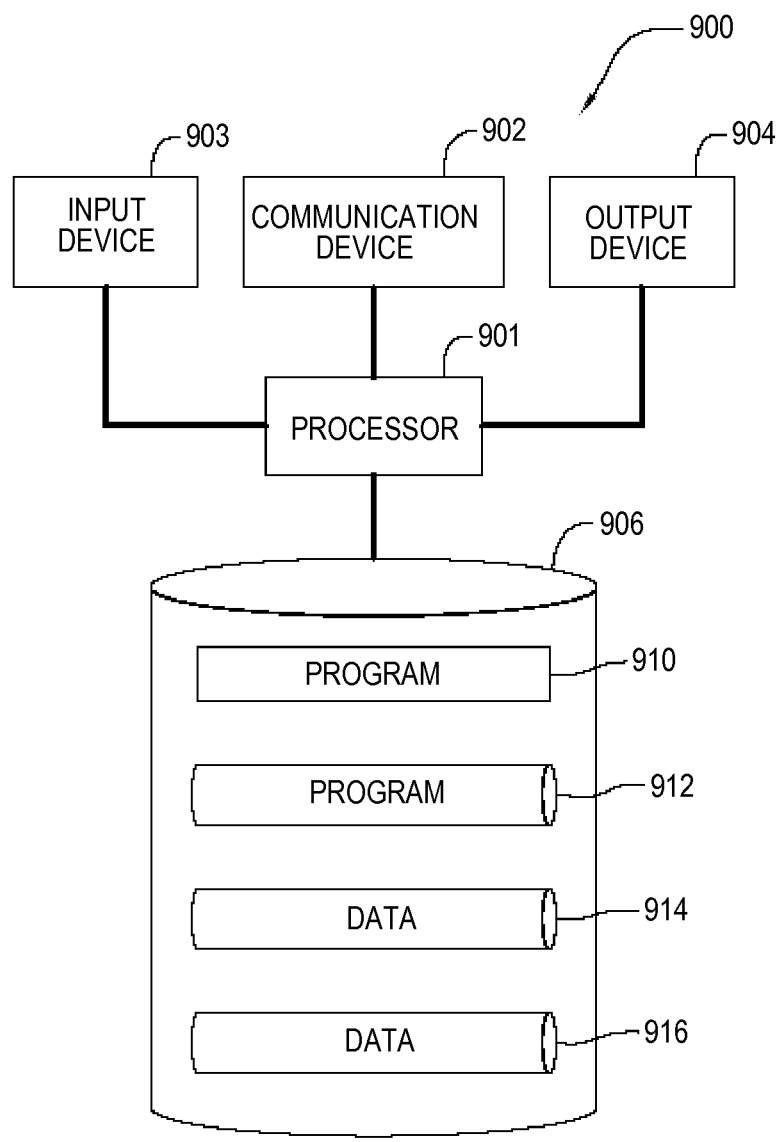
FIG. 6 is a block diagram of an architecture, according to some embodiments.

FIG. 6 is a block diagram of an architecture 900 according to some embodiments. In some embodiments, one or more of the systems, devices and/or circuitry (or portion(s) thereof) disclosed herein may have an architecture that is the same as and/or similar to one or more portions of the architecture 900.

Referring to FIG. 6, in accordance with some embodiments, the architecture 900 includes a processor 901 operatively coupled to a communication device 902, an input device 903, an output device 904 and a storage device 906.

In some embodiments, the processor 901 may execute processor-executable program code to provide one or more portions of the one or more functions disclosed herein and/or to carry out one or more portions of one or more embodiments of one or more methods disclosed herein. In some embodiments, the processor 901 may be a conventional microprocessor or microprocessors.

The communication device 902 may be used to facilitate communication with other devices and/or systems. In some embodiments, communication device 902 may be configured with hardware suitable to physically interface with one or more external devices and/or network connections. For example, communication device 902 may comprise an Ethernet connection to a local area network through which architecture 900 may receive and transmit information over the Internet and/or one or more other network(s).

The input device 903 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 904 may comprise, for example, one or more devices used to output data and/or other information, such as, for example: an IR port, a dock, a display, a speaker, and/or a printer, etc.

The storage device 906 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 906 may store one or more programs 910-912, which may include one or more instructions to be executed by the processor 901.

In some embodiments, the one or more programs may include one or more operating systems, database management systems, other applications, other information files, etc., for operation of the architecture 900.

The storage device 906 may store one or more databases 914-916 and/or criteria for one or more programs. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a computer program product, and/or an article where the article includes a machine readable storage medium with instructions stored thereon. As used herein, a machine may be any type of machine. In some embodiments, a machine comprises a computer. In some embodiments, a machine comprises a proximity coupling system.

As used herein, a signal may be any type of signal, i.e., a physical quantity (e.g., voltage, current, or magnetic field), an indication, a message and/or any other type of signal or combination thereof.

A wireless communication interface may be any type of wireless communication interface.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

As used herein, a proximity payment device refers to any device, of any shape, that transmits an account number to a POS system via wireless transmission. As used herein, an account number may be numeric, non numeric and/or a combination thereof.

In some embodiments, a proximity payment device may also have a contact interface like that of a conventional smart card that includes a contact interface.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for operating a payment system to allow a first token and a second token associated with a venue to be used as payment devices to conduct payment transactions using the payment system, the method comprising:

receiving a request from a customer to associate a first token identifier and a second token identifier with a payment account, the first and second token identifiers uniquely identifying the first token and the second token, respectively and allowing holders thereof access to a venue, and wherein the first and the second tokens are not associated with the payment account prior to the request;

establishing, at the payment system, a temporary use period, the temporary use period defining a start date and time and an end date and time during which the first and the second tokens are enabled for use as a payment device;

transferring, by the payment system, a first predetermined amount of funds to the first token from the payment account for use during the temporary use period;

transferring, by the payment system, a second predetermined amount to the second token from the payment account for use during the temporary use period;

receiving information identifying first use criteria associated with the first token and second use criteria associated with the second token, the first and second use criteria to be applied by the payment system during a transaction authorization process involving either of the first token and the second token, the first use criteria different from the second use criteria and the second use criteria including (i) data indicative of goods and/or services that may be purchased using the second token, (ii) data indicative of an amount that can be spent using the second token, and (iii) data indicative of a restricted portion of the venue at which purchases may not be made using the second token;

activating the first token and second token for use as payment devices at point of sale devices in communication with the payment system such that the payment system applies the temporary use period, the predetermined amount of funds, and the first and second use criteria during the transaction authorization process when either of the first token and second token are presented at a point of sale device; and automatically transferring, by the payment system to the payment account, any funds remaining on the first token and the second token after the end date and time.

2. The method of claim 1, wherein the receiving the request from the customer to associate the first token identifier and the second token identifier with the payment account comprises receiving a request directly from the customer to associate the first token identifier and the second token identifier with the payment account.

3. The method of claim 1, wherein the first token comprises a ticket to the venue; and wherein the second token comprises a ticket to the venue.

4. The method of claim 1, further comprising:
reporting the association of the first token identifier and the association of the second token identifier on a statement for the payment account.

5. The method of claim 1, wherein the second use criteria further identifies:
a good that may not be purchased using the second token.

6. The method of claim 1, wherein the temporary use period is based at least in part on a date of an event at the venue.

7. The method of claim 1, further comprising:
receiving a request during the temporary use period to authorize a payment transaction utilizing at least one of the first token and the second token;
determining, by the payment system, that at least a portion of the first predetermined amount of funds or the second predetermined amount of funds is available and that the first use criteria and the second use criteria are being followed; and
authorizing the payment transaction.

8. The method of claim 7, further comprising reporting the payment transaction on a statement for the payment account.

9. The method of claim 7, further comprising sharing revenue from a charge to perform at least a portion of the payment transaction between at least two of the venue, a token issuer, and a financial institution.

10. An apparatus, comprising:
a processor;
a communication device operably connected to the processor; and
a storage device operably connected to the processor, the storage device storing non-transient instructions configured to cause the processor to:
receive a request from a customer to associate a first token identifier and a second token identifier with a payment account, the first and second token identifiers uniquely identifying a first token and a second token allowing holders thereof access to a venue, and wherein the first and the second tokens are not associated with the payment account prior to the request;
establish a temporary use period, the temporary use period defining a start date and time and an end date and time during which the first and the second tokens are enabled for use as a payment device;
transfer a first predetermined amount of funds to the first token from the payment account for use during the temporary use period;
transfer a second predetermined amount to the second token from the payment account for use during the temporary use period;
receive information identifying first use criteria associated with the first token and second use criteria associated with the second token identifier, the first and second use criteria to be applied by the payment system during a transaction authorization process involving either of the first token and the second token, the first use criteria different from the second use criteria and the second use criteria including (i) data indicative of goods and/or services that may be purchased using the second token, (ii) data indicative of an amount that can be spent using the second token, and (iii) data indicative of a restricted portion of the venue at which purchases may not be made using the second token;
activate the first token and second token for use as payment devices at point of sale devices in communication with the payment system such that the payment system applies the temporary use period, the predetermined amount of funds, and the first and second use criteria during the transaction authorization process when either of the first token and second token are presented at a point of sale device; and
automatically transfer to the payment account any funds remaining on the first token and the second token after the end date and time.

* * * * *